(12) United States Patent
Kesselman et al.

(10) Patent No.: US 7,631,108 B2
(45) Date of Patent: Dec. 8, 2009

(54) METHOD AND APPARATUS FOR EXECUTING EVENT DRIVEN SIMULATIONS

(75) Inventors: Jeffrey P. Kesselman, Menlo Park, CA (US); Doug Twilleager, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 811 days.

(21) Appl. No.: 11/129,219

(22) Filed: May 13, 2005

(65) Prior Publication Data

US 2005/0266926 A1 Dec. 1, 2005

Related U.S. Application Data

(60) Provisional application No. 60/570,541, filed on May 13, 2004.

(51) Int. Cl.
G06F 15/16 (2006.01)
(52) U.S. Cl. .................. 709/250; 709/230; 709/231; 709/205; 709/206; 709/207; 712/208; 719/313
(58) Field of Classification Search .............. 709/250, 709/230–231, 205–207; 712/208; 719/313
See application file for complete search history.

(56) References Cited

U.S. PATENT DOCUMENTS

| | | | | | |
|---|---|---|---|---|---|
| 3,683,418 | A | * | 8/1972 | Martin | 711/152 |
| 4,227,245 | A | * | 10/1980 | Edblad et al. | 700/95 |
| 4,807,111 | A | * | 2/1989 | Cohen et al. | 710/54 |
| 5,274,809 | A | * | 12/1993 | Iwasaki et al. | 718/104 |
| 5,329,626 | A | * | 7/1994 | Klein et al. | 709/248 |
| 5,377,352 | A | * | 12/1994 | Tanaka et al. | 718/103 |
| 5,974,532 | A | * | 10/1999 | McLain et al. | 712/208 |
| 6,002,674 | A | * | 12/1999 | Takei et al. | 370/254 |
| 6,195,701 | B1 | * | 2/2001 | Kaiserswerth et al. | 709/231 |
| 6,256,659 | B1 | * | 7/2001 | McLain et al. | 718/100 |
| 6,295,518 | B1 | * | 9/2001 | McLain et al. | 703/23 |
| 6,415,317 | B1 | * | 7/2002 | Yelon et al. | 709/205 |
| 6,618,817 | B1 | * | 9/2003 | Armstrong | 714/4 |
| 6,826,523 | B1 | * | 11/2004 | Guy et al. | 703/22 |

(Continued)

FOREIGN PATENT DOCUMENTS

EP 0 423 725 A2 4/1991

(Continued)

OTHER PUBLICATIONS

Dawson Engler and Ken Ashcraft, "RacerX: Effective, Static Detection of Race Conditions and Deadlocks", Stanford University, all pages.*

(Continued)

*Primary Examiner*—Bunjob Jaroenchonwanit
*Assistant Examiner*—Hua Fan
(74) *Attorney, Agent, or Firm*—Osha • Liang LLP

(57) ABSTRACT

A system that includes an object store layer configured to store a plurality of objects, wherein each of the plurality of objects comprises a method, a communication layer configured to receive an event from a user and generate a task based on the event, and a simulation layer configured to retrieve one of the plurality of objects responsive to execution of the task and execute the method associated with the one of the plurality of objects.

14 Claims, 7 Drawing Sheets

U.S. PATENT DOCUMENTS

| | | | |
|---|---|---|---|
| 7,088,993 B2 * | 8/2006 | Dumont et al. | 455/412.2 |
| 7,260,187 B1 * | 8/2007 | McAllister | 379/88.04 |
| 2002/0087737 A1 * | 7/2002 | Czajkowski et al. | 709/313 |
| 2003/0236901 A1 * | 12/2003 | Barazesh et al. | 709/230 |
| 2004/0268381 A1 * | 12/2004 | Simelius et al. | 725/19 |

FOREIGN PATENT DOCUMENTS

| | | | |
|---|---|---|---|
| JP | 2000-070840 A | * | 9/2001 |
| WO | WO 01/59568 A2 | | 8/2001 |

OTHER PUBLICATIONS

Machine tranlation of Foreign Patent JP-2000-070840A, Hosouchi M, "An exclusive control mechod and a machne system", Sep. 2001, all pages.*

PCT International Search Report dated Feb. 21, 2006 (3 pages).

Steven Kent; "Alternate Reality: The History of Massively Multi-player Online Games"; http://www.amd.com/us-en/Processors/ProductInformation/0,,30_118_9485_9488%5E9563%5E9599%5E9793,00.html (7 pages).

Richard Bartle; "Early MUD History"; Nov. 15, 1990; http://www.mud.co.uk/richard/mudhist.htm (2 pages).

* cited by examiner

METHOD AND APPARATUS FOR EXECUTING EVENT DRIVEN SIMULATIONS

CROSS-REFERENCE TO RELATED APPLICATIONS

This application claims benefit of provisional application Ser. No. 60/570,541 filed on May 13, 2004. The provisional application is hereby incorporated by reference.

BACKGROUND

One common usage of the Internet is multiplayer gaming. The first generation of large scale multiplayer Internet games included MUDs (Multi-User Dungeons) and their successors: MUSHs (Multi-User Shared Hallucinations) and MOOs (MUD Object Oriented). Unlike today's multiplayer games, these first generation games were all text-based adventure simulations whose form was derived from the old single player Infocom text-adventures (e.g., ZORK).

This first generation of multiplayer games were typically implemented using state machines, where each state corresponded to an environment description (e.g., "You are in a long narrow corridor with doors at both ends."). Further, the player actions moved the players from one state to the next. In some implementations, objects used within a state were attached to that state, such that they were listed as part of the state description and may be obtained whenever a player returns to that state.

MUDs and their successors formalized the concept of a state by introducing the notion of a "room." Specifically, each of the descriptive states corresponded to a room. Further, the rooms were implemented such that a player in a particular room may only interact with that particular room (e.g., the environment of the room) and players currently in the room. In addition, system performance with a given room (e.g., latency experienced by users in the room, etc.) was maintained by limiting the number of players who could simultaneously occupy a particular room.

With respect to the implementation, MUDs typically executed in a single memory space and usually as a single process. Further, the MUDs typically maintained all the active game states in memory and performed periodic dumps to a hard-drive back-up for failure recovery purposes. Today's multiplayer games that are based on event driven simulations currently have been built upon the foundations laid by the MUDs and their successors. In particular, the notion of a "room" still persists today. However, the "rooms" have evolved to represent a 3D space and are displayed to a user using 3D graphics. The evolved representation of "rooms" is now more commonly referred to as "regions" or "areas." However, the underlying purpose of the room, i.e., to divide up to the user-base to handle scaling, has not changed.

Similar to its predecessors, each region (or more specifically the description of the state of the region) is still maintained in memory. However, the implementation of the regions has been modified to allow each region to execute in its own process in a separate memory space. The following description provides a brief overview of the operation of a multiplayer game that uses event driven simulation. Initially, a user logs into the multiplayer game via a login server. Once authenticated, the client (i.e., the computer through which the user is interacting with the multiplayer game) is instructed to disconnect from the login server and connect to a region server supporting (i.e., executing) the starting region, if the user is a new player. Alternatively, if the user is a returning player, the client is instructed to connect to the region server supporting the last region the player was in. Once the client is connected to the appropriate region server, the user may then participate in the multiplayer game. When the user moves to a different region, the corresponding client is instructed to drop the connection with the current region server and connect to the region server which supports the region to which the user has moved.

Similar to the implementation of rooms within the MUDs, the aforementioned regions typically limit the number of users that may be simultaneously connected to a region (or, more specifically, a region server supporting the region). When this limit is reached, the region is "full" and no additional users are allowed to connect until a user currently in the region disconnects from the region (i.e., leaves the region). However, to increase the number of users that may be allowed enter a particular region, multiplayer games may implement "shards."

In general, shards correspond to simultaneously executing copies of a region within the multiplayer game. Depending on the implementation, each shard for a particular region may be executing on a different server. Thus, when a user attempts to move to a particular region, the multiplayer game attempts to connect the user to one of the shards that supports the particular region. While shards increase the number of users that may be in a particular region, the shards typically do not allow users within different shards of the same region to interact.

SUMMARY

In general, in one aspect, the invention relates to a system that includes an object store layer configured to store a plurality of objects, wherein each of the plurality of objects comprises a method, a communication layer configured to receive an event from a user and generate a task based on the event, and a simulation layer configured to retrieve one of the plurality of objects responsive to execution of the task and execute the method associated with the one of the plurality of objects.

In general, in one aspect, the invention relates to a method for executing a task comprising requesting an initial object corresponding to the task, retrieving the initial object from an object store layer, assigning a transactional context and execution thread to the task, and executing an initial method from the initial object.

Other aspects of the invention will be apparent from the following description and the appended claims.

DESCRIPTION

Figure 1:
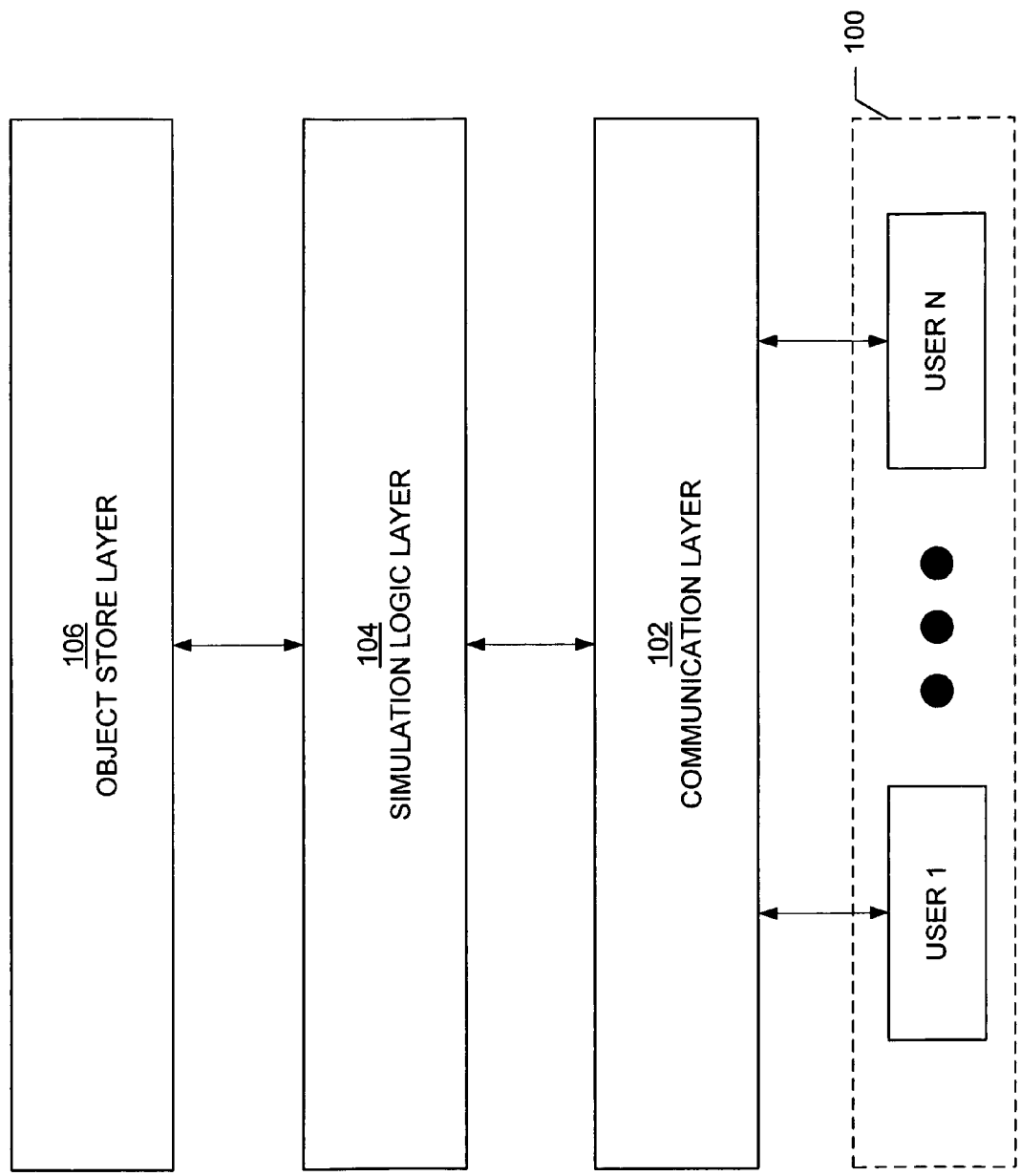
FIGS. 1 through 3 show various views of a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a method and apparatus to provide low-latency, high-bandwidth, fault-tolerant, highly scalable event driven simulation services. Further, embodiments of the invention, provide a platform to support multiplayer games, where the multiplayer games are event driven simulations. Further, embodiments of the invention provide a method and apparatus to allow a developer to create simulation programs (e.g., multiplayer games, etc.) without requiring the simulation developer to have any knowledge about multi-threading, transactional databases, or an in-depth knowledge about scalable systems.

FIG. 1 shows a system in accordance with one embodiment of the invention. As shown in FIG. 1, the system includes a communication layer (102), a simulation logic layer (104) and an object store layer (106). Each of the aforementioned layers is described below. As shown in FIG. 1, the communication layer (102) provides an interface for the users (100) to interact with the system. The communication layer (100), in turn, is operatively connected to the simulation logic layer (104). Further, the simulation logic layer (104) is operatively connected to the object store layer (106).

As discussed above, the communication layer (102) provides an interface to between the users (100) and the system. More specifically, in one embodiment of the invention, the communication layer (102) includes functionality to receive data from various devices (e.g., cell phones, Personal Digital Assistants (PDAs), desktops, laptops, etc.) in various communication protocols. The communication layer (102) also includes functionality to convert the data into a format that may be used by the system.

In accordance to one embodiment of the invention, the simulation logic (104) layer includes functionality to receive data from the communication layer (102). The simulation logic layer (104) includes also functionality to process the received data (discussed below). In one embodiment of the invention, the simulation logic layer (104) processes the data using a stateless task processor (i.e. a processor which treats each task as an independent transaction). In order to process the received data, the simulation logic layer (104) interacts with the object store layer (106).

In one embodiment of the invention, the object store layer (106) includes one or more objects, typically, serializable objects (SOs), as well as functionality to manage the objects (e.g., functionality to send copies of the objects to the simulation logic layer (104), functionality to update the content of the objects, track which objects are currently being used, etc.). In one embodiment of the invention, each object includes data and/or a method for acting on the data within the object or other object. Returning to the discussion of FIG. 1, the simulation logic layer (104) typically requests the object store layer (106) to provide various objects. In response to the request, the object store layer (106) sends the requested objects (or copies of the requested objects) to the simulation logic layer (104). A method for request and receiving an object (e.g., an object) is described below in FIGS. 4-6. In one embodiment of the invention, the object store layer (106) also includes functionality to track of the state for each simulation executing in the system. For example, if the system is executing a multiplayer game (i.e., the simulation executing on the system is an event driven simulation), then the object store layer (106) may store, in addition to storing objects for the multiplayer game, the player states and information about the players.

In one or more embodiments of the invention, the object store layer (106) may be implemented as a transactional distributed database. Those skilled in the art appreciate that the object store layer (106) may be implemented using other types of storage systems, e.g., a flat-file, a hierarchical, network, object-oriented or object-relational database, etc.

Figure 2:
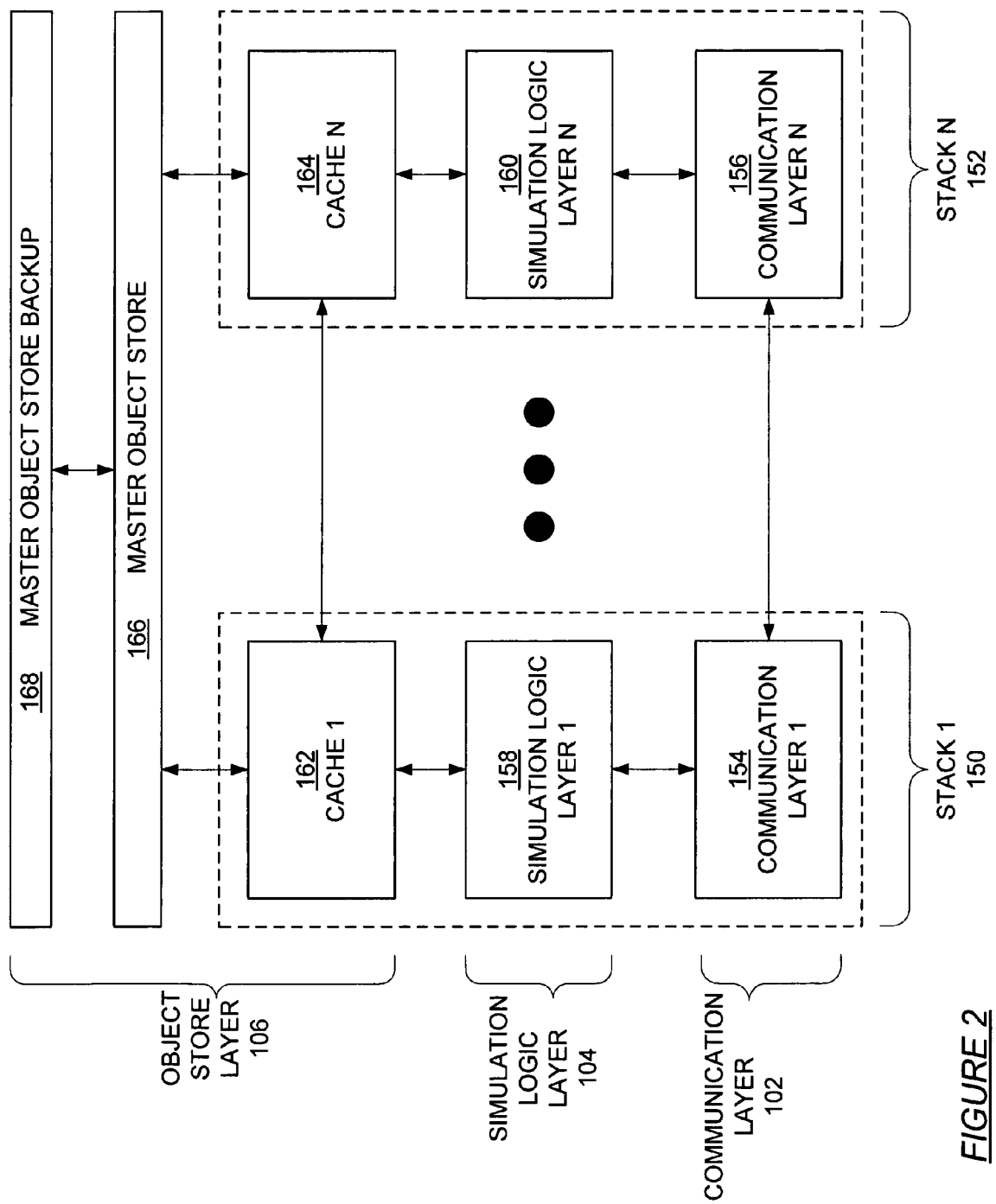

FIG. 2 shows a system in accordance with one embodiment of the invention. As shown in FIG. 2, the system may be divided into a series of stacks (150, 152) where each stack includes a communication layer component (154, 156), a simulation logic layer component (158, 160), and an object store layer component (106). Each of the aforementioned components includes the functionality of the layer to which they belong. For example, each communication layer component (154, 156) includes the functionality to the communication layer (102) described as FIG. 1. Continuing with the discussion of FIG. 2, the communication layer component (154, 156) within a given stack (150, 152) may communicate with other communication layers in other stacks (150, 152). This functionality allows users connected to different stacks (150, 152) to communicate with each other.

Further, in one embodiment of the invention, the individual communication layers component (154, 156) within the stacks (150, 152) may communicate with each other in order to provide load balancing across the various stacks (150, 152) executing in the system. For example, in one embodiment of the invention, stacks (150, 152) (via their respective communication layer components (154, 156)) may send periodic load updates (e.g., information about the current load on the stack (150, 152)) to each other. The aforementioned information may be used to transfer users from heavily loaded stacks to a lightly loaded stack. This allows for the system to load balance across all stacks in the system.

As shown in FIG. 2, the communication layer component (154, 156) in the stack (150, 152) is operatively connected to a simulation logic layer component (158, 160) associated with the stack (150, 152). Unlike the communication layer (154, 156) in the stack (150, 152), the simulation logic layer component (158, 160) in the stack (150, 152) is not connected to simulation logic layer components (158, 160) in the other stacks (150, 152). Rather, the simulation logic layer component (158, 160) in each stack (150, 152) is only operatively connected to the communication layer component (154, 156) and the object store layer component (106) of the stack (150, 152) in which the simulation logic layer component (158, 160) resides.

In one embodiment of the invention, the object store layer (106) within a stack (150, 152) corresponds to a cache (162, 164). Further, the cache (162, 164) in each stack (150, 152) may communicate with other caches (162, 164) in other stacks (150, 152) as well as communicate with a master object store (166). In one embodiment of the invention, the cache (162, 164) within a given stack (150, 152) stores the most recently requested and/or accessed objects from the master object store (166). In one embodiment of the invention, the system may include a master object store backup (168). The purpose of the master object store backup (168) is to replicate/mirror the content of the master object store (166) such that the master object store backup (168) may take the place of the master object store (166) in the event that the master object store (166) fails. For example, if data is corrupted in the master object store (166), then the data may be found in the master object store backup (168). In one embodiment of the invention, each stack (150, 152) in the system may be associated with its own processor (or processors) and its own memory space. Alternatively, a single processor may be associated with one or more stacks.

Figure 3:
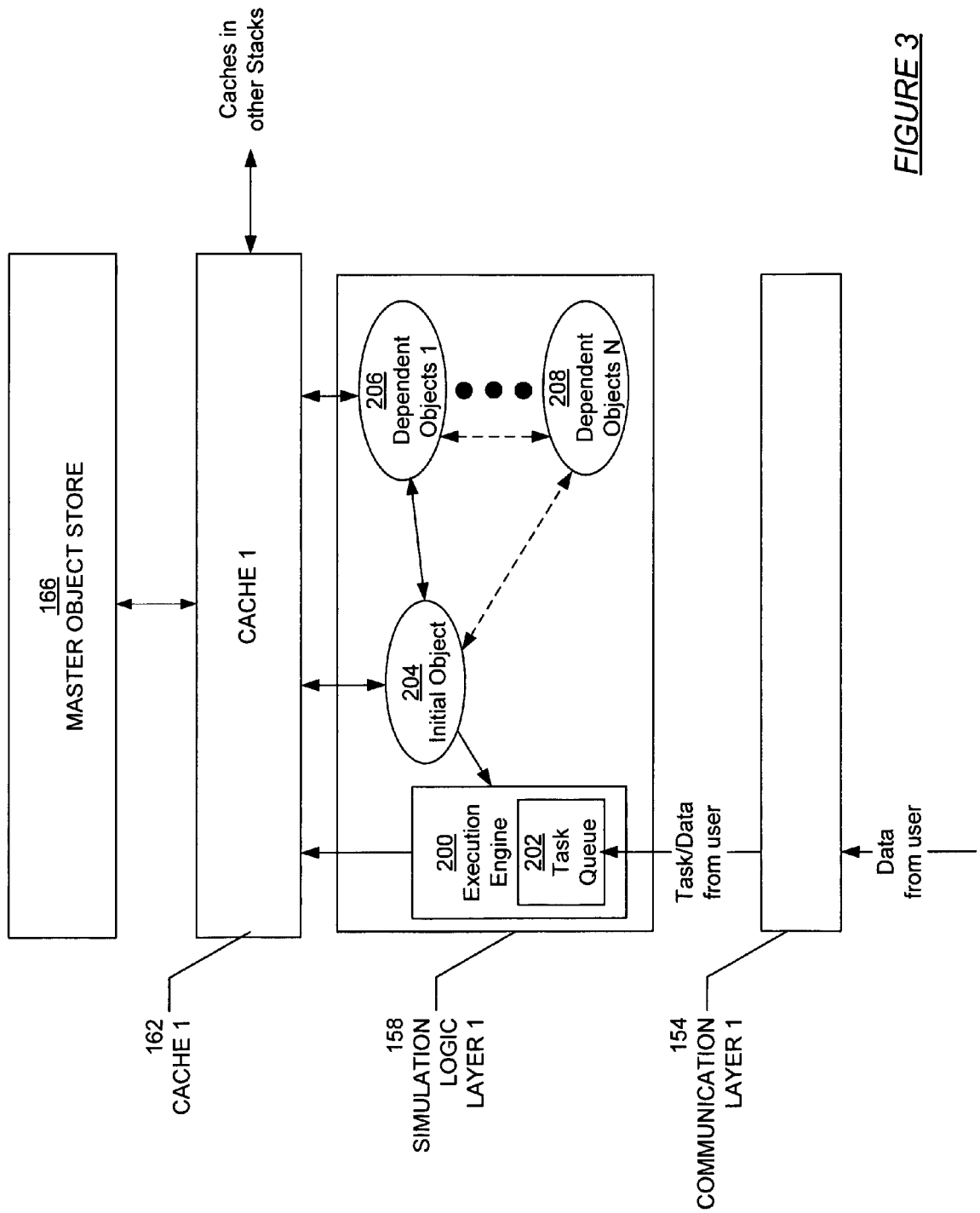

FIG. 3 shows a system in accordance with one embodiment of the invention. More specifically, the FIG. 3 shows a detailed view of one stack within a system in accordance with one embodiment of the invention. Specifically, as described above, a stack may include a communication layer component (154), simulation logic layer component (158), and an object store layer component (represented in as a cache (162)). Further, as described above, the stack may be operatively connected to a master object store (166).

In accordance with one embodiment of the invention, the communication layer component (154) may include an event listener (not shown). The event listener may be assigned to a user after a user logs onto the system. The event listener includes functionality to receive data from a user (not shown). Those skilled in the art will appreciate that an event may be in the form of any input (e.g., movement of joystick, stroke of key on keyboard, movement in virtual reality zone, or any user action that generates an input into a device) or lack thereof (e.g., an event generated by lack of input from timing), generated by the user. As discussed above, the communication layer component (154) includes functionality to reformat the data received from the user, if required, and functionality to send the data to the simulation logic layer component (158). The communication layer component (154) may also include functionality to create a task based on the event from the user. After creating a task, the communication layer component (154) may send the task to the simulation logic layer (158). Those skilled in the art will appreciate that the user may send a task (as opposed to an event) to the system.

Continuing with the discussion of FIG. 3, the simulation logic layer (158) includes an execution engine (200) with a task queue (202). The task and/or data sent from the communication layer component (154), as described above, may be used to populate the task queue (202). Those skilled in the art will appreciate that if data (typically defining an event) is received from the user, then the data is used to create a task. Once created, the task queued on the task queue (202).

In accordance with one embodiment of the invention, the task queue (202) may include the tasks from one or more users. Those skilled in the art will appreciate that the queue may use any protocol (e.g., first-in-first-out, last-in-first-out, a priority based, etc.) to track tasks within the task queue (202) and to determine the order in which to execute the tasks.

In accordance with one embodiment of the invention, a task is executed using the execution engine (200). The execution engine (200) may include functionality to execute the task by assigning an execution thread for the task and executing the execution thread. Those skilled in the art will appreciate that assigning an execution thread to a task allows the task to execute independent of other tasks. Thus, the other tasks may be simultaneously executed by the execution engine (200).

In accordance with one embodiment of the invention, as a result of executing the task, an initial object (204) may be retrieved from: (i) the cache (162) in the stack in which the execution engine (200) resides, (ii) the cache in another stack (e.g., 164 in FIG. 2), or (iii) the master object store (166). The execution of the task may also require one or more dependent objects (206, 208) to be retrieved. In accordance with one embodiment of the invention, the dependent objects (206, 208) may be obtained in the same manner as the initial object (204). When the execution thread is finished executing, then the execution engine (200) may include functionality to return the objects, both the initial object (204) and dependent objects (206, 208) (if any exist), to the object store layer (106 in FIG. 2), thereby committing the transaction.

Figure 4:
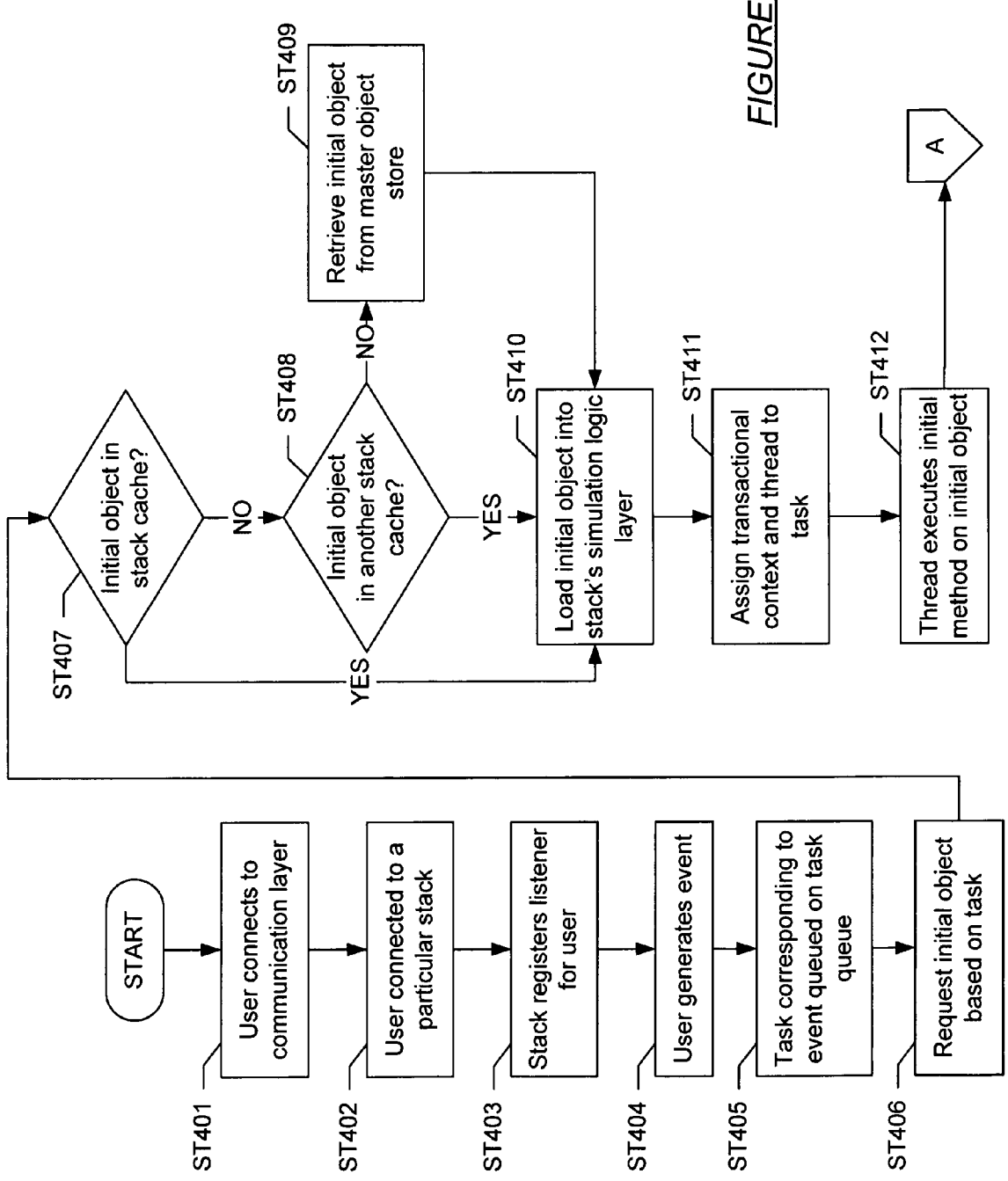
FIGS. 4 though 6 show methods in accordance with one embodiment of the invention.

FIG. 4 shows a method in accordance with one embodiment of the invention. Initially, a user connects to the communication layer (ST401). In one embodiment of the invention, the user may connect to the communication layer by typing a Uniform Resource Locator (URL) associated with the system, executing a program which allows for automatic connection to the communication layer, etc. The user is subsequently connected to a particular stack (ST402). In accordance with one embodiment of the invention, the user is automatically routed to a stack with a minimal number of users in order to maintain load-balancing. Although not shown is FIG. 4, as part of being connected to a particular stack (ST402), the user may be authenticated to the stack. Alternatively, the user may be authenticated when the user connects to the system (i.e., prior to being connected to a particular stack within the system).

Continuing with FIG. 4, once a user is connected to a stack, the stack may register an event listener for the user (ST403). The event listener may be used to notify the system when the user generates an event. The notification may include, for example, triggering an interrupt in the communication layer. When the user generates an event (ST404), a task corresponding to the event is subsequently queued on the task queue (ST405). When it is time for the task to be executed (i.e., when the task has the highest priority to be executed), the task is removed from the task queue and an initial object, based on the task, is requested (ST406). In response to the request, a determination is then made as to whether the initial object is in the cache of the stack local to the user. If the initial object is in the cache of the stack local to the user, then the initial object is obtained from the cache of the stack local to the user and loaded into the stack's simulation logic layer (ST410).

The object may be obtained, for example, using a get command or a peek command. In accordance with one embodiment of the invention, the get command locks the object, thereby preventing access to the object to other tasks. Alternatively, locking the object may only prevent access to the object by tasks which request an object using a get command. In one embodiment of the invention, a peek command does not lock the object; rather, the peek command creates a task-local copy of the object using the object's last saved value and the object is not updated in the cache, master object store, or master backup object store using after the task is completed. Further, in accordance with one embodiment of the invention, if the initial object is locked by another task, then the current task waits until the other task has released the lock in order to obtain the object using a get command.

Continuing with FIG. 4, if the initial object is not in the cache of the stack local to the user, then a determination is made as to whether the initial object is in another cache associated with another stack (ST408). If the object is in another cache associated with another stack, then the object is loaded in the simulation logic layer of the stack associated with the user (ST410). If, however, the object is determined not to be in another stack, then the object may be obtained from the master object store (ST409) before being loaded in the stack's simulation logic layer (ST410).

After the initial object is loaded into the stack's simulation logic layer, in accordance with one embodiment of the invention, a transactional context and a thread are assigned to the task (ST411). The transactional context may be used, for example, to uniquely identify a transaction in the system. In accordance with one embodiment of the invention, the transactional context may include a timestamp portion and a random number portion. The timestamp portion may be determined according to the task (e.g., created when the task is placed in the task queue (ST405), when the initial object is loaded (ST410), when the transactional context is assigned (ST411), etc.). In ST412, the thread initiates execution of the task (i.e., the thread executes the initial method associated with the initial object on the initial object). Those skilled in the art will appreciate that the initial method is usually present in the initial object. As described above, executing the task may require obtaining and executing one or more dependent objects.

Figure 5:
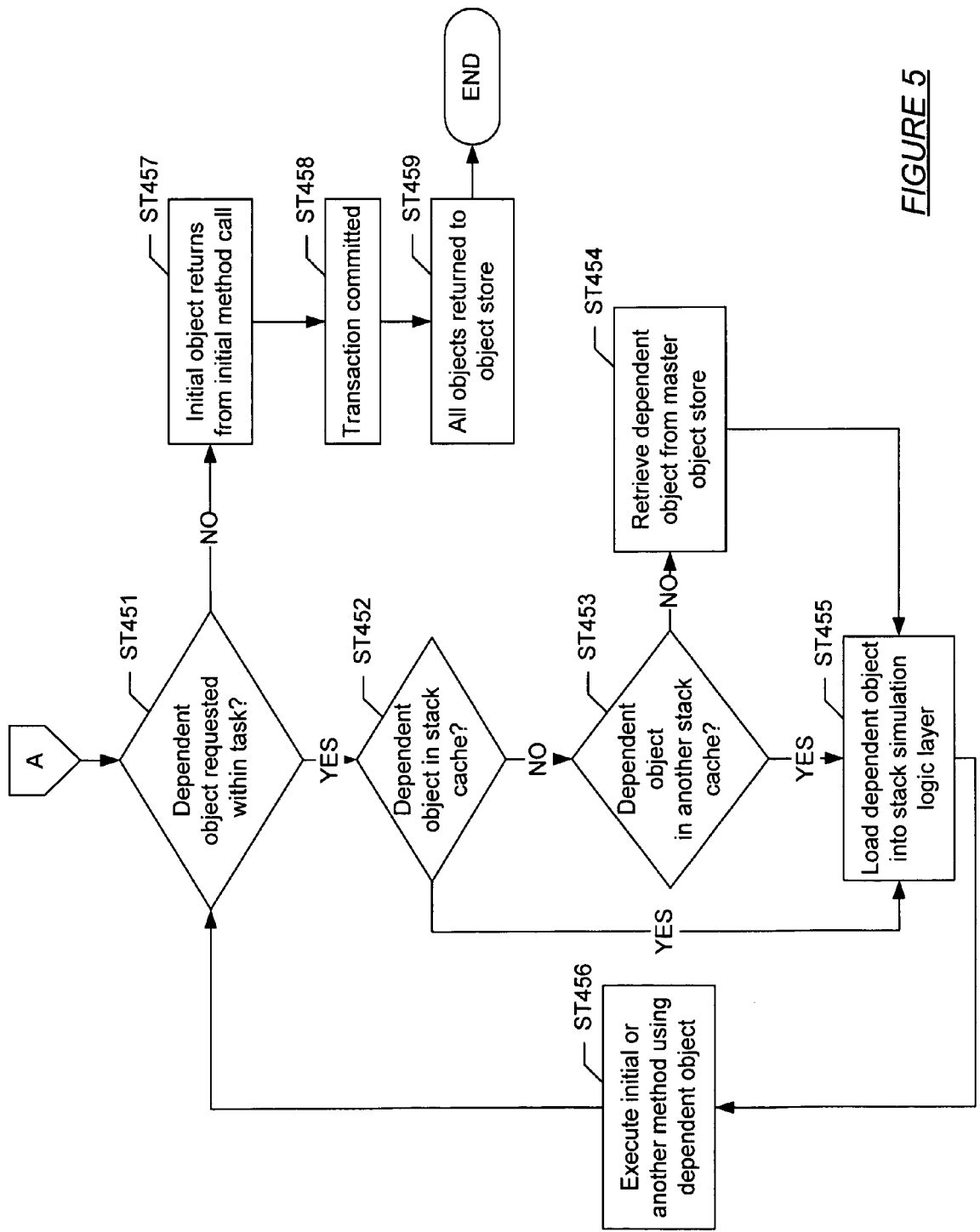

FIG. 5 shows a method for obtaining and executing one or more dependent objects and completing the execution of a task in accordance with one embodiment of the invention. Initially, a determination is made as to whether a dependent object is requested within the task (ST451). If a dependent object is not requested, then the initial object returns from the initial method call (ST457) and the transaction is committed (ST458). In accordance with one embodiment of the invention, a transaction is committed when any modifications to the initial object become permanent. Once the transaction has committed, the initial object is returned to the object store (ST459). Returning an object to the object store may include, for example, releasing any locks associated with the object, etc.

Continuing with FIG. 5, if in ST451 it is determined that a dependent object is requested within the task, then a determination is made as to whether the dependent object is in the cache of the stack local to the user (ST452). If the dependent object is in the cache of the stack local to the user, then the dependent object is obtained from the cache of the stack local to the user and loaded into the stack's simulation logic layer (ST455).

Alternatively, the dependent object may not be in the cache of the stack local to the user, in which case, in accordance with one embodiment of the invention, a determination is made as to whether the dependent object is in another cache associated with another stack (ST453). If the dependent object is in another cache associated with another stack, then the dependent object is loaded in the simulation logic layer of the stack associated with the user (ST455). If, however, the dependent object is determined not to be in another stack, then the dependent object may be obtained from the master object store (ST454) and loaded in the stack simulation logic layer (ST455).

Continuing with FIG. 5, once the dependent object is loaded, the initial method or another method is executed using the dependent object (ST456). The other method may include, for example, a method associated with a dependent object or a method not associated with any object. Further, executing an initial or other method on the dependent object may result in a request for another dependent object. In ST451, a determination is made if another dependent object is requested within the task. If another dependent method is required within the task, then the process repeats starting with ST452.

Alternatively, another dependent object might not be requested from within the task. In which case, the execution using the dependent object is completed and the initial object returns from the initial method call (ST457). Next, the transaction commits (ST458). After the transaction commits, all objects are returned to the object store (as described above) (ST459).

In order to load a dependent object from the object store (as described in ST 455 of FIG. 5), in accordance with one embodiment of the invention, the task may first obtain a lock for the object. This may be performed, for example, when the task uses a get command in order to obtain the object. Those skilled in the art will recognize the potential for deadlocks that may result when more than one task accesses more than one object.

Figure 6:
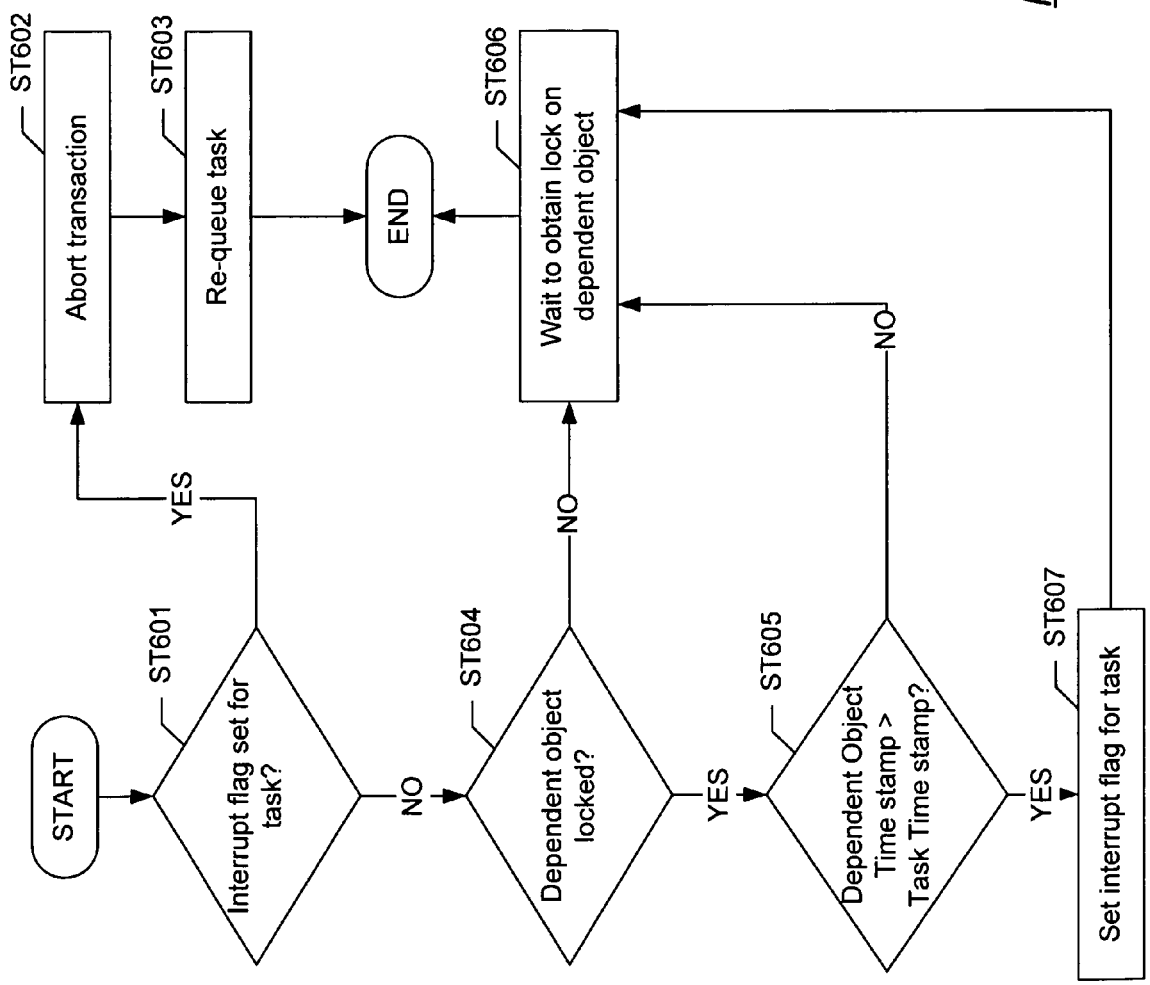

FIG. 6 shows a method for preventing deadlocks in accordance with one embodiment of the invention. Initially, a determination is made as to whether a flag is set for the task (ST601). A flag may be set for a task, for example, when a task with more priority (e.g., a task with a timestamp value older than the current task, the task is more critical than the current task, etc.) requests access to an object locked by the current task. If a flag is set for the task, then the transaction aborts (ST602). In accordance with one embodiment of the invention, aborting a transaction may include returning the state of all objects modified by the task to the state of the object before the object was accessed by the task. After the states have been changed, the locks on the objects held by the task are released and the task surrenders all threads and the transaction. Next, the task is re-queued (ST603).

In accordance with one embodiment of the invention, the task queue queues tasks according to timestamp values associated with the task. Thus, if the newer tasks are always flagged and re-queued while the older tasks execute, then starvation may be successfully avoided. This allows for fairness in the system in which all tasks may execute.

Continuing with FIG. 6, in accordance with one embodiment of the invention, if a determination is made that the interrupt flag is not set for the task (ST604), then a determination is made as to whether the dependent object that the task requested is locked (ST604). If the dependent object is not locked, then the task passes to ST606, and obtains the lock on the dependent object (not shown). In accordance with one embodiment of the invention, after the task obtains the lock on the dependent object, the timestamp of the task is associated with the dependent object.

Alternatively, if a determination is made that the dependent object is locked in ST604, then a determination is made in ST605 as to whether the timestamp associated with the dependent object is greater than the timestamp associated with the task. If the timestamp associated with the dependent object is greater than the timestamp associated with the task, then the object waits to obtain the lock on the dependent object (ST606). This allows for the older task to complete execution.

In accordance with one embodiment of the invention, when the task waits, the thread of the task is put to sleep. Thus, the thread may not execute until an interrupt is set for the thread of the task, such as when the dependent object is released. When the lock is released, in accordance with one embodiment of the invention, the waiting task obtains the lock on the dependent object (not shown). Next, the timestamp of the task may be associated with the dependent object.

Those skilled in the art will appreciate that while the above deadlock detection has been described with respect to timestamps, other priority implementations may also be used. For example, in ST605, a determination may be made as to whether the task having the lock of the dependent object has greater priority than the current task. If the task having the lock of the dependent object has greater priority than the current task, then the current task may wait until the lock is released.

Continuing with ST605 of FIG. 6, if the timestamp of the dependent object is not greater than the timestamp associated with the task, then the task is older than the task holding the lock for the dependent object. Thus, an interrupt is set for the task holding the lock of the dependent object (ST607). In accordance with one embodiment of the invention, the current task waits to obtain the lock on the dependent object (ST606). The current task may obtain the lock, for example, after the task holding the lock has completed aborting the transaction (as described in ST602). Once the current task has obtained the lock of the dependent object, the timestamp of the task may be associated with the dependent object.

In accordance with one embodiment of the invention, a presence of a deadlock condition is checked every time a timestamp is updated. This helps prevent massive long-term failure in the system.

In accordance with one embodiment of the invention, a tracking mechanism may be used to track the number of potential deadlocks in the system. A potential deadlock may occur, for example, if a transaction must abort. If a large number of potential deadlocks exist, then the tracking mechanism may issue an alert. This allows for a system administrator to keep track of the state of the system.

Figure 7:
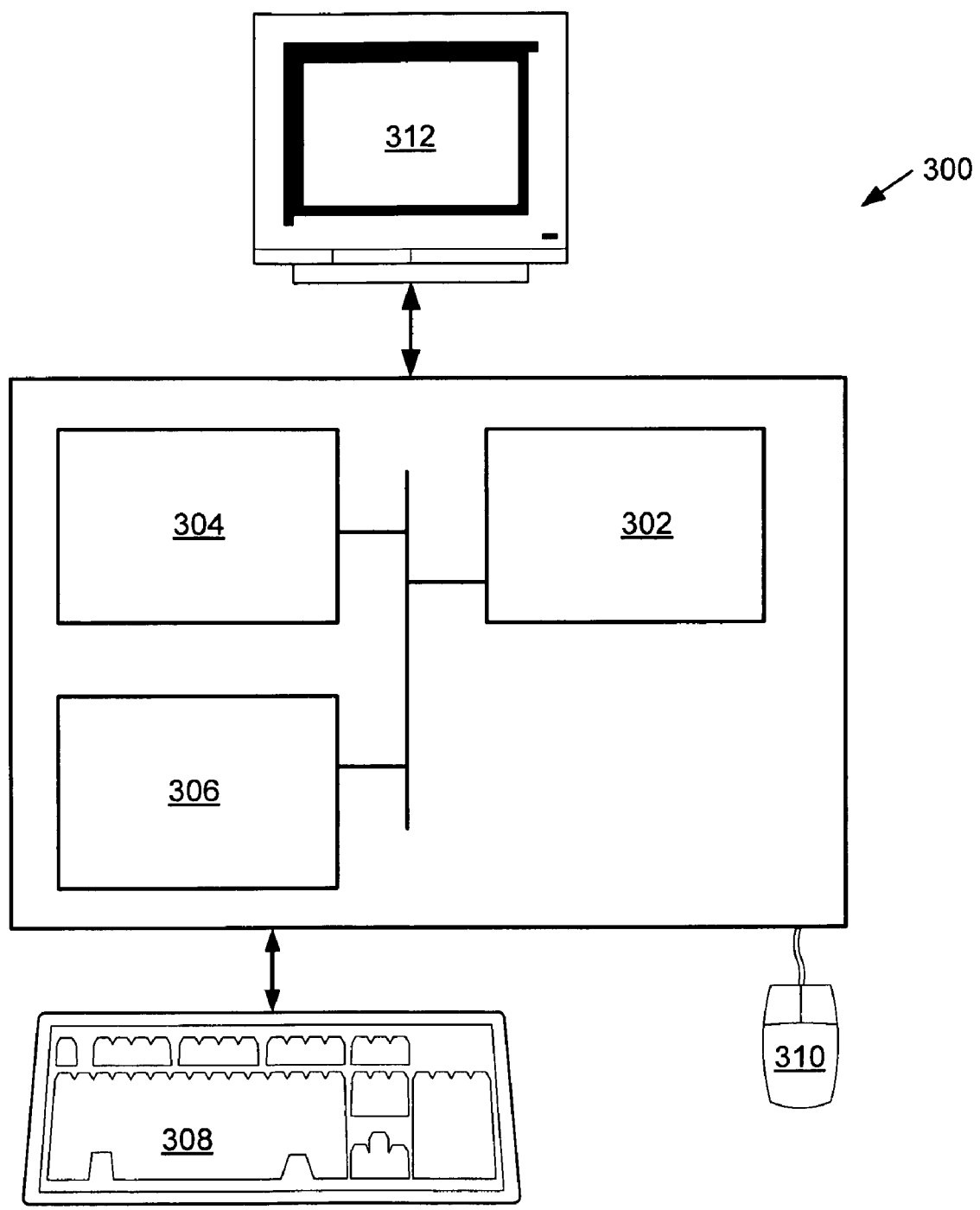
FIG. 7 shows computer system in accordance with one embodiment of the invention.

The invention may be implemented on virtually any type of computer regardless of the platform being used. For example, as shown in FIG. 7, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., object store layer, communication layer, simulation logic layer, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a master object store configured to store a plurality of objects corresponding to a multiplayer game environment, wherein each of the plurality of objects comprises a method; and
   a plurality of computer systems for manipulating the multiplayer game environment, wherein each computer system of the plurality of computer systems executes a stack, and wherein the stack comprises:
      a cache for storing a subset of the plurality of objects from the object store layer;
      a communication layer component configured to:
         receive an event from a user manipulating the multiplayer game environment;
         generate a task based on the event; and
         place the task in a task queue; and
      a simulation layer component configured to:
         obtain the task from the task queue,
         load an initial object of the plurality of objects corresponding to the task from the cache when the initial object is in the cache,
         load the initial object from the master object store when the initial object is not in the cache,
         assign a transactional context and execution thread to the task, wherein the transactional context comprises a time stamp portion and a random number portion,
         execute the task by the execution thread, wherein executing the task comprises executing the method in the initial object to generate a modified initial object,
         request a dependent object of the plurality of objects using the initial method;
         retrieve the dependent object, wherein retrieving the dependent object comprises checking for a deadlock condition, wherein checking for the dead-lock condition comprises:
            determining whether an interrupt flag of the task is set, wherein the interrupt flag is set to false when the task is created;
            if the interrupt flag of the task is not set:
               setting the interrupt flag for the task, if the dependent object is locked and a dependent object time stamp is greater than a task time stamp; and
               waiting to retrieve the dependent object; and
            if the interrupt flag of the task is set:
               aborting a transaction associated with the task; and
               re-queuing the tasking in the event queue; and
         commit the modified initial object to the master object store to update the multiplayer game environment.

2. The system of claim 1, wherein the communications layer component of the stack executing on one of the plurality of computer systems is operatively connected to the communications layer component of the stack executing on another of the plurality of computer systems.

3. The system of claim 1, wherein the cache of the stack executing on one of the plurality of computer systems is operatively connected to the cache of the stack executing on another of the plurality of computer systems.

4. The system of claim 1, wherein the cache component is configured to retrieve and send at least one of the objects to the master object store, wherein the master object store is shared across the plurality of computer systems.

5. The system of claim 1, wherein each of the plurality of objects is a serializable object.

6. The system of claim 1, wherein the cache locks the one of plurality of objects retrieved from the cache.

7. The system of claim 1, wherein the simulation layer further comprises an execution engine configured to execute the task.

8. The system of claim 1, wherein the communication layer comprises functionality to allow one user to communicate with another user.

9. The system of claim 1, wherein the communication layer comprises functionality to load balance the system.

10. A computer readable medium, encoded with software instructions executable by a processor on a computer system, for executing a task, wherein the executing the task comprises:
   receiving, by the computer system, an event generated by a user manipulating a multiplayer game environment while connected to the computer system;
   queuing the task corresponding to the event in a task queue on the computer system;

removing the task from the task queue;
requesting an initial object corresponding to the task from a cache on the computer system;
retrieving the initial object from an object store layer, wherein the object store layer comprises a master object store shared by a plurality of computer systems and a cache on the computer system, wherein the cache is configured to store a subset of the plurality of objects from the object store layer, wherein the initial object is retrieved from the cache when the initial object is in the cache, wherein the initial object is retrieved from the master object store when the initial object is not in the cache, and wherein the computer system is one of the plurality of computer systems;
assigning a transactional context and execution thread to the task, wherein the transactional context comprises a time stamp portion and a random number portion;
executing, by the execution thread, an initial method present in the initial object to generate a modified initial object;
requesting a dependent object using the initial method;
retrieving the dependent object, wherein retrieving the dependent object comprises checking for a dead-lock condition, wherein checking for the dead-lock condition comprises:
    determining whether an interrupt flag of the task is set, wherein the interrupt flag is set to false when the task is created;
    if the interrupt flag of the task is not set:
        setting the interrupt flag for the task, if the dependent object is locked and a dependent object time stamp is greater than a task time stamp; and
        waiting to retrieve the dependent object; and
    if the interrupt flag of the task is set:
        aborting a transaction associated with the task; and
        re-queuing the tasking in the event queue; and
    commit the modified initial object to the object store layer to update the multiplayer game environment,
wherein the plurality of computer systems modify a same multiplayer game represented in the master object store.

11. The computer readable medium of claim 10, further comprising:
executing the dependent object;
returning the dependent object to the object store layer;
completing execution of the initial method; and
returning the modified initial object to the master object store.

12. The computer readable medium of claim 11, wherein retrieving the dependent object comprises at least one selected from the group consisting of a get command and a peek command.

13. The computer readable medium of claim 10, wherein the dependent object time stamp corresponds to the time stamp of a task that has currently locked the dependent object.

14. The computer readable medium of claim 10, wherein checking for the dead-lock condition occurs whenever a time stamp is updated.

* * * * *